(12) United States Patent
Galvin et al.

(10) Patent No.: US 7,930,287 B2
(45) Date of Patent: Apr. 19, 2011

(54) SYSTEMS AND METHODS FOR COMPOUND SEARCHING

(75) Inventors: Brian Galvin, Seabeck, WA (US); Alan McCord, Dublin, CA (US); Donald R. Boys, Aromas, CA (US)

(73) Assignee: Michelli Capital Limited Liability Company, Dover, DE (US)

( * ) Notice: Subject to any disclaimer, the term of this patent is extended or adjusted under 35 U.S.C. 154(b) by 95 days.

(21) Appl. No.: 12/048,637

(22) Filed: Mar. 14, 2008

(65) Prior Publication Data

US 2009/0234835 A1    Sep. 17, 2009

(51) Int. Cl.
*G06F 17/30* (2006.01)
(52) U.S. Cl. ........................................................ 707/706
(58) Field of Classification Search .................. 707/2, 4, 707/5, 706; 709/203
See application file for complete search history.

(56) References Cited

U.S. PATENT DOCUMENTS

| | | | | |
|---|---|---|---|---|
| 2002/0059201 | A1* | 5/2002 | Work | 707/3 |
| 2005/0278317 | A1* | 12/2005 | Gross et al. | 707/3 |
| 2006/0271524 | A1* | 11/2006 | Tanne et al. | 707/3 |
| 2007/0174279 | A1* | 7/2007 | Jatowt et al. | 707/7 |
| 2008/0133505 | A1* | 6/2008 | Bayley et al. | 707/5 |
| 2008/0235187 | A1* | 9/2008 | Gade et al. | 707/3 |

* cited by examiner

*Primary Examiner* — Etienne P LeRoux
(74) *Attorney, Agent, or Firm* — Turocy & Watson, LLP

(57) ABSTRACT

A search service includes a network-connected server, a data repository coupled to the first server, and software resident in the data repository and executing on the first server. The service, through the software, presents an interactive interface to a user, determines, through iterative interaction with the user a purpose for a search, develops search criteria for the search, enters the criteria to one or more standard search engines accessible through the network, and collects results of the search on behalf of the user.

31 Claims, 4 Drawing Sheets

SYSTEMS AND METHODS FOR COMPOUND SEARCHING

BACKGROUND OF THE INVENTION

1. Field of the Invention

This invention is in the broad field of information technology, and pertains more particularly to providing information to customers shopping in brick-and-mortar retail establishments, the information pertaining to products and services for sale.

2. Description of Related Art

As information proliferates at an ever-increasing pace, one of the greatest areas of need in information technology is in the area of ways to find needed information, as described briefly above, and this is an area served in one important aspect by search engines and associated systems that enable users to find information, such as in web pages in the Internet network. Search systems and search engines are a particular focus in embodiments of the present invention.

A goal of most search engines is to make it possible for users to easily find and/or access relevant data on the world wide web (WWW). Relevance is always of great importance, and is perhaps best judged by the person looking for the information.

A key subsystem of most known search engines is a system for crawling the Web and collecting information, known in the art as a Web crawler. Without regularly crawling the Web to update the information there available, a search engine will rapidly become outdated and irrelevant. Further the Web crawling subsystems are needed to be efficient and to operate on a relatively large scale. Ideally such search engines should operate without disrupting the Web itself or the sites (pages) that are crawled. Many innovations in this area are sought, including methods for checking pages for updates including soliciting involvement from content owners in notifying the search engine enterprises of relevant changes, methods for caching data and parallelizing the process of crawling, and more. Typically the result of the Web crawling is a database of Web content that may span more than 10 billion Web pages, all or part of the content of which may be collected and archived by the search engine.

Pages collected by a crawler subsystem are analyzed in a variety of ways well known in the art to create an index of page identifiers and links to the pages. Such a search index serves much the same purpose as the index of a book; for any term or terms entered as search criteria, a list of pages, with links to those pages, is returned. More broadly, a goal of the Web search index is to return a list of pages when a user enters a search query such as, for example, "dramatic innovations". Typically pages returned are pages in which the terms are simply present, although it might be preferable to also return pages that may not contain the search terms, but may nevertheless be relevant to the needs of the person who enters the search query. For instance, in response to a search query stated as "dramatic innovations", the search engine might return links to the history of the Wright Brothers' airplane innovation, even though the history may not comprise the specific term. Relevance is of great importance. A Web crawler is a means to an end in search. An index built from information garnered by a crawler is one of the core elements of a search system.

An index, however, is of little use unless users can use it to search the Web, so a user interface is needed. In such an interface, typically operated from an application known in the art as a browser, the user enters a search query and typically presses Enter. The query is sent, via the Internet network, to the enterprise hosting the search service, of which several major enterprises are well-known. The search engine then uses the present index (the index may change over time as Web crawling progresses) to make a list of Web pages that match the search query. Again, a key challenge is to provide that the most relevant results for this particular user are displayed at or near the top of the list.

The known need for relevance has been a very important motivator in developing a page ranking algorithm. A page ranking algorithm (or node ranking algorithm) is a ranking subsystem, which determines the order of display of the search results. The criticality of this function is that a person searching is going to look at the top-listed pages, rather than digging down to buried information, especially if it is clear that there is a ranking system meant to present more relevant pages nearer the top. Additionally, if the relevance determinations are considered authoritative by many users, the tendency to only look at highly-ranked search results becomes more pronounced, making the impact of the relevance scores very large.

One of the most effective page ranking algorithms in the art at the time of filing the present application is the PageRank algorithm of Google™, Incorporated. The effectiveness of the PageRank algorithm is related in the current art, at least in part, to a structural graph and a matrix computation. The structural graph is a representation of the structure of linkages between pages in the form of a "graph", as is well known in the art of graph theory. It is well known that, although there are additions and variations, the PageRank system basically works by giving indexed pages a score that is calculated by adding up the number of links that point to the page to be ranked from other pages, and weighting this score based on similar scores calculated for the linking pages. That is, if there are five pages that link to a page to be ranked, but no other page links to the five pages, then the PageRank for that page will be much lower than for a page that has five in-links that each come from highly ranked linking pages (these in turn are highly ranked because many pages link to them, and so on). It is clear that the calculation for page ranking involves relatively complex mathematics, since the score of one page is determined by the scores of linking pages, whose scores are in turn determined by the scores of their linking pages, whose scores are determined by the scores of their linking pages, and so on at least to some pre-determined depth.

From this description it becomes clear why a graph is needed—in current art it is necessary to understand the structure of linkages that connect Web pages in order to perform the calculation, which is based on these links.

In a somewhat abstract sense one may visualize the WWW as a vast array of dots (points, or nodes), each of which represents a Web page connected in the Internet network. To represent nearly all of the existing pages at any one point in time would need perhaps $10^{10}$ points. Each of the pages is, of course, a collection of code, typically in HTML format (or one of its well-known extensions such as DHTML, Cascading Style Sheets, etc.), that defines page content, which may be presented by the page through a user's computer typically using a web browser, which may include text, graphics, audible music and voice, video, and more. Another component of almost any page in the Web is at least one link for initiating a transfer to a different page, or in some cases more recently, initiating a transfer of code and data to a user's computer for some purpose, without requiring transition to a different page.

FIG. 1 is a very simple illustration of the one-dot-for-a-page illustration or view of the WWW introduced above. Only five page-representative dots are shown, as sufficient for the purpose, these being pages 101 through 105. A link for the present purpose may be considered the well-known navigational element in the display of a web page for which the cursor typically turns into a hand with a mouseover, and for which clicking-on asserts an address (such as a Universal resource locator URL), which takes the user to another Web page. The link area in a display can be an icon, text, or even an animated figure.

In FIG. 1 the links are shown as arrows. Note that page 105 has links to all of pages 101 through 104, none of which link back to page 105. Links 101 through 104 each have one link to another one of the pages. It is helpful to consider that, although a link is a link, there is a difference in links from the view of the page itself. From the viewpoint of the page, a link may be an out-link (an outgoing link to another page) or an in-link to the instant page from another page. Consider, for example, page 103, which has two in-links, one each from pages 102 and 105, and one out-link to page 104. Consider also that not all links to or from these five pages may be shown, because a very limited subset of pages is illustrated. Page 105, for example, may have several in-links from pages not shown. For the purpose of a state-of-the-art page ranking system, it is the in-links that are typically most important.

In the current art, according to all of the information known to the inventor, the PageRank algorithm and all other search ranking systems are based on the static link structure of the World Wide Web, as briefly described above. The random page graph shown, with the links shown, however, is not a good mathematical model for the purpose. For better computation efficiency a better model (graph) is shown in FIG. 2. The inventor terms this graph a Structural Web Graph (SWG). It should be understood as well, at the outset, that a SWG may only ever show a subset of the WWW structure, and the size and structure of the WWW is in constant flux. In this SWG concept each Web page in the WWW (or a subset) is still a point, but the pages are not illustrated in random space, but in rows and columns. So in the SWG of FIG. 2 there are five rows, each identified by the page association, and also five columns, each also identified by the same page association. By using the same five pages as in FIG. 1, a six-by-six matrix results, considering the five pages and the necessity of having an origin to the matrix. If the matrix were defined for essentially all Web pages, it would be as big as $10^{10}$ rows and $10^{10}$ columns.

In FIG. 2 the rows and columns are shown with identifiers for the pages associated with each row and column. In a workable, mathematical definition to be machine-manipulated, the rows and columns would simply be identified in a data convention; the matrix might never be displayed.

The matrix as shown in FIG. 2 creates a row-column intersection for each page represented with every other page represented in the matrix. This is a basis of its utility. There is also an intersection for each page with itself, which has no utility for the present purpose, and these intersections have been marked in FIG. 2 by an X.

Now consider, as an example of the utility of the SWG, which is well-known in the art, the following illustration. The intersection of the row for page 104 with the column for page 102, which is labeled in FIG. 2 as element 201, presents an opportunity to represent a particular relationship between pages 104 and 102, which may be shown in a number of ways, one of which is simply a value placed at the intersection. In this case the value, by convention, is to represent whether there is an in-link from 102 to 104. Since there is not, the value is zero.

It should be recognized that at an intersection the convention of labeling the intersection with a value based on the existence of a link from the page represented by the column to the page represented by the row is arbitrary; one could as easily have chosen a convention of in which the element 201 would represent a link from page 104 to page 102, and would thus still be set to zero (since the path from 102 to page 104 is indirect; there is no link from 102 to 104 in FIG. 1). A primary function of the SWG utilized in most search engines in the art is to capture the plurality of link relationships between pages in a computationally useful way. In-links are the most useful, since they represent the choices of web page designers to link from the pages they are designing to other web pages. It will be appreciated that pages that are heavily linked to are likely to be more relevant, whereas pages with many out-links may or may not be relevant (the designers of these pages being free to add more out-links, since they control the content of their own pages, they would be able to easily inflate the relevance scores of their pages). A web crawler may garner this information by crawling each web page and noting the links from that page to other pages; in the case of element 201 of FIG. 2, the crawler when reaching page 104 would have noted no link to page 102 and thus marked a zero in element 201, as shown in FIG. 2.

Crawling FIG. 1 provides information that page 104 is linked (has in in-link) from page 103, but not from page 102. Therefore the value at 201 is zero, but the value at the intersection of the row for 104 and the column for page 103 is 1. By the same process, crawling FIG. 1 the values at all of the other intersections are determined, and have been indicated in FIG. 2.

In this particular example, the values are one or zero, which may be convenient for computer simulation and manipulation. Of course other values may be assigned, and in the real world values may be weighted by a number of other considerations, not just whether there is an in-link from the secondary to the primary page. For example, it is common in the art to normalize the values of the Structural Web Graph so that the sum of all of the values in the Structural Web Graph is equal to one, making each value equal to a probability that a random web surfer might make a particular transition from one page to the next (and, continuing this convention, the sum of the values of a column represent the probability that a random web surfer will, after a long session, find herself on the page represented by the column).

A page ranking algorithm, which may take many forms, might, in a primitive form, just consider the SWG once to rank a page. The value at each intersection may be one or zero, but there is a possibility of a 1 for a primary page at each intersection for another page. For page 104 the sum of values at intersections across the row is two. So page 104 may be given a rank value of two, since two pages (103 and 105) link into page 104. The rank value for page 105 would be the sum for the row for page 105, or zero, since no pages link in to page 105. In FIG. 2 the sum for every row but 105 is two, so the pages other than 105 may have equal rank, or there may be a tie-breaker in the algorithm. In a real-world case there are many, many more intersections to consider, and one page may be seen to be linked to from dozens or hundreds of other pages.

In a more sophisticated situation, the page ranking algorithm may first consider the row sum for a page, and then look at the in-links for each of the secondary pages at the positive intersections; that is, an answer to the question: How many pages link in to each page that links directly to the page being ranked, which may be extended to how many (and which ones) link to each page that links to the instant page. Now the value for ranking becomes more realistic and granular, but is still limited to the structural links designed into the pages of the Web. This approach is the basis of the well-known PageRank algorithm pioneered by Google™; the heuristic that drove this step was that links represented authorities, and the relative in-link density of a given authority provides a good indication of the importance of that authority. So at least a nominal relevancy was indicated.

In summary, a search engine in the present art comprises a few key elements, such as a Web crawler to discover and gather information about Web pages, an index of Web pages composed of information garnered by the crawler, a search function that determines which of the pages in the index to present to a viewer, based at least in part on the search query entered by the browsing person, a Structural Web Graph based also on the information retrieved by the crawler, and a PageRank algorithm that uses the Structural Web Graph and values assigned in the graph to give each page a unique PageRank score, for ordering the displayed return of the pages. U.S. Pat. No. 6,285,999 issued to Lawrence Page describes and claims such a PageRank system. U.S. Pat. No. 6,285,999 is incorporated by reference in the present application.

Bearing in mind many of the difficulties attendant to search technology, many of which are described above, it is clear that provision of correct and expedient search criteria by individuals seeking information from networked collections is a serious difficulty, and returning information ranked for relevancy is also a distinct challenge for conventional search systems, such as those provided by Mozilla™, Google™ and Yahoo™. Having considered all of these difficulties the inventor believes that what is clearly needed is an intermediary system and methods that will provide greatly enhanced search capability for individuals in dealing with more conventional search services.

BRIEF SUMMARY OF THE INVENTION

The inventors in the present case, having determined that there are serious problems in conventional search systems and practice, have developed a unique compound system to produce far better results. In one embodiment a search service is provided, comprising a network-connected server, a data repository coupled to the first server, and software resident in the data repository and executing on the first server. The service, through the software, presents an interactive interface to a user, determines, through iterative interaction with the user a purpose for a search, develops search criteria for the search, enters the criteria to one or more standard search engines accessible through the network, and collects results of the search on behalf of the user.

In another aspect of the invention a method for searching is provided, comprising steps of (a) presenting, by an interactive search service executing on a network-connected server executing software from a coupled data repository, an interactive interface to a user; (b) determining by the service, through iterative interaction with the user a purpose for a search; (c) developing search criteria; (d) entering the developed criteria to one or more standard search engines connected to the network; and (e) collecting results of the search on behalf of the user.

DETAILED DESCRIPTION OF THE INVENTION

In yet another aspect of the present invention methods and systems are provided for enhancing search capabilities for individuals seeking information from networked collections like the WWW.

Figure 1:
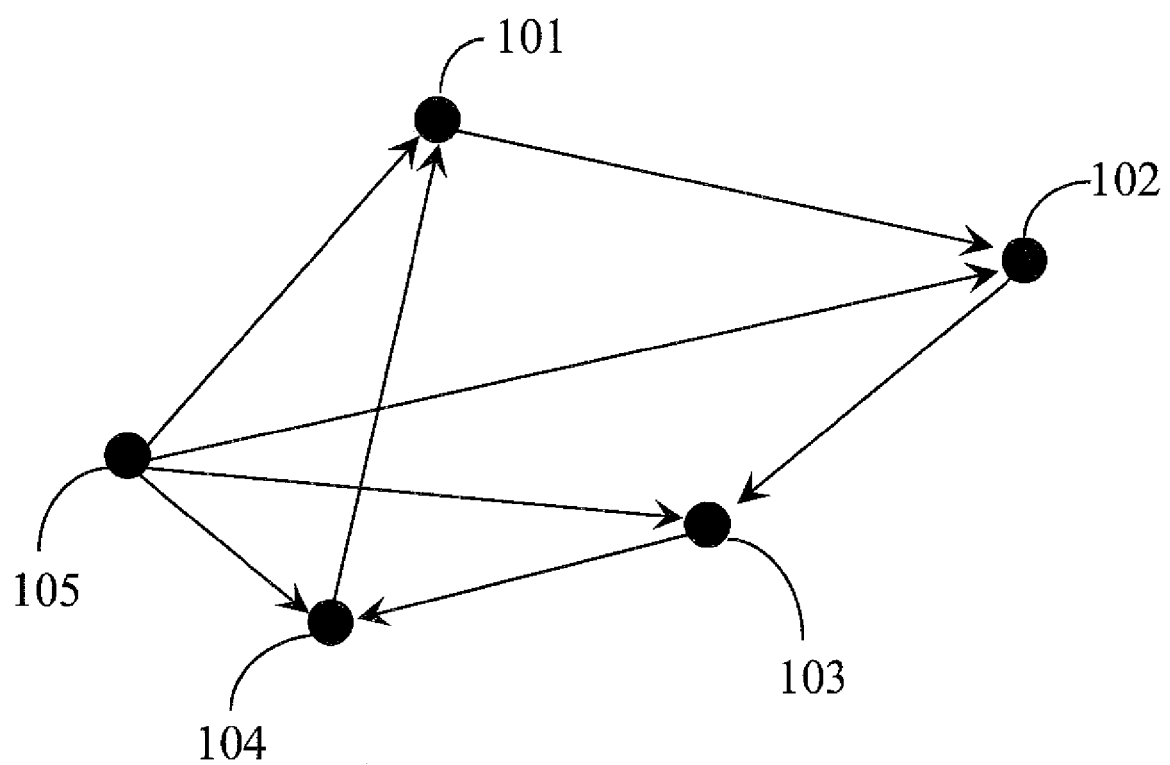
FIG. 1 is a simple representation of page nodes in an Internet network.
Figure 2:
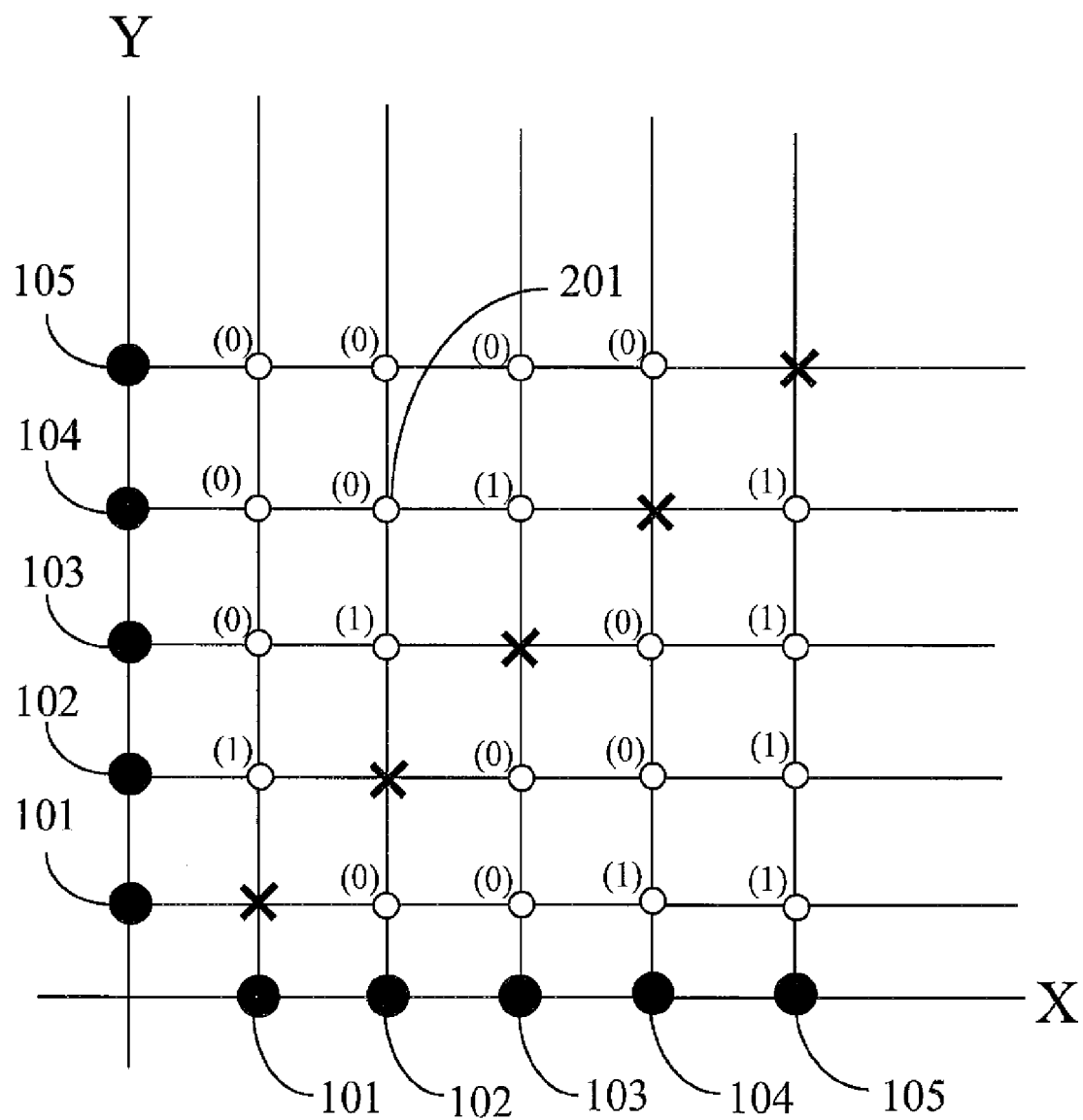
FIG. 2 is an illustration of a Structural Web Graph.
Figure 3:
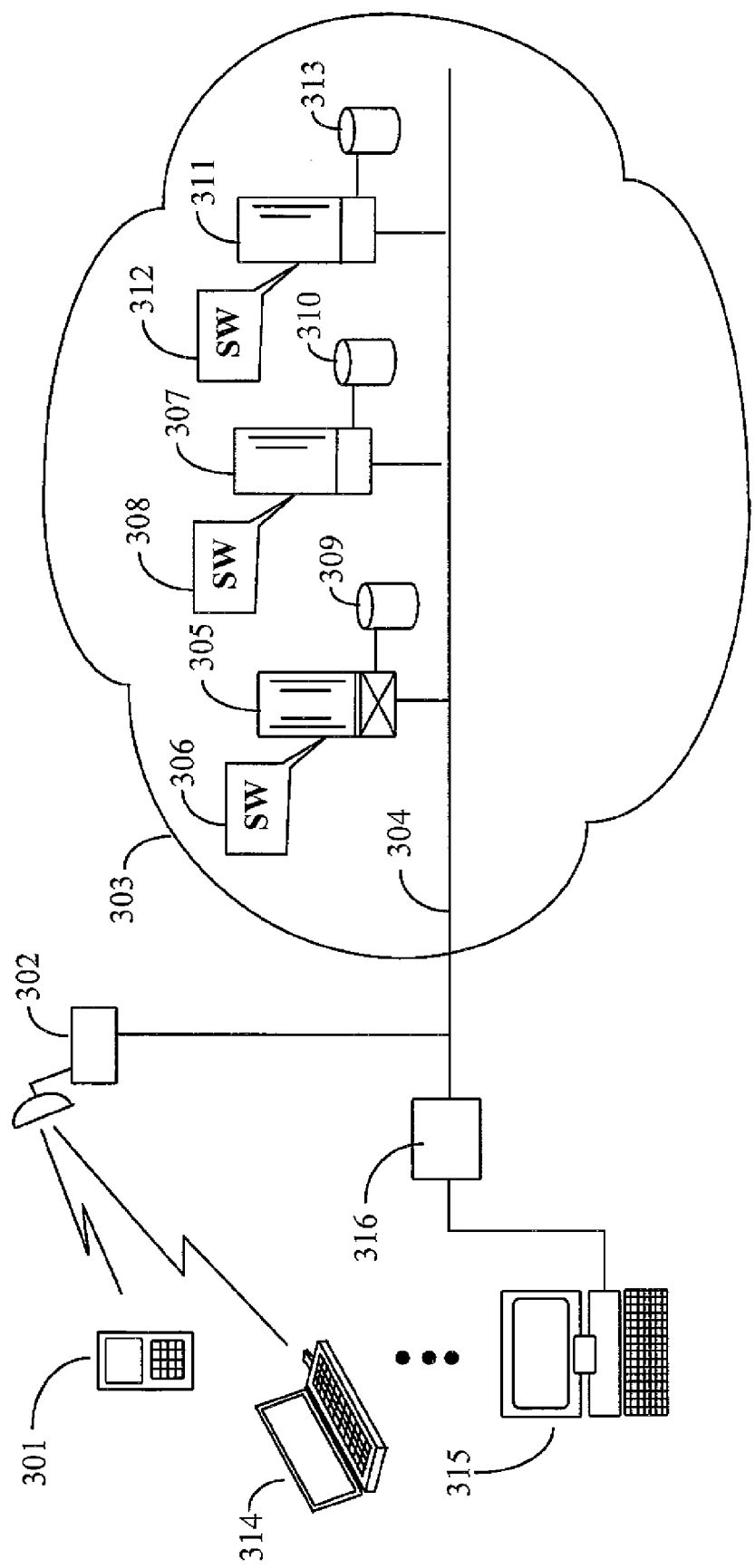
FIG. 3 is a diagram depicting a compound searching system in an embodiment of the present invention.

FIG. 3 is a diagram depicting architecture pertinent to an overall searching system in an embodiment of the present invention. Mobile appliance 301 represents mobile appliances of all sorts, such as many cellular telephones, the Apple™ iPhone™, the Blackberry™ device, other personal digital assistants, and the like that have ability to access a wide-area network (WAN) 303 like the well-known Internet network, and from which searches might be initiated through commercially available search systems. In this specification the Internet network is used in description of embodiments, but is not necessarily the only network useful in embodiments of the invention. As is common in the art, appliances 301 are wirelessly enabled, and communicate wirelessly via base stations, such as station 302. In some cases in the art stations are arranged in a hierarchical manner, and there are a variety of architectures through which signals from and to the mobile appliances may be transmitted. The simple diagram shown is meant to represent all such architectures.

A laptop computer 314 is illustrated as connecting also wirelessly through base station 102, using what is termed in the art an air card, which accomplishes Internet activity through a cellular telephone network. The laptop might connect also via WiFi networks, such as those offered by Starbucks™ and many others. The laptop might also connect directly by modem, such as by DSL through a landline telephone system.

A desktop computer 315 is illustrated connecting by landline through an Internet Service Provider 316. The desktop might connect in other ways as well.

The illustration of mobile appliance 301, laptop computer 314 and desktop computer 315, all connecting in one manner or another to line 304, which is meant to represent all of the interconnections in the Internet network, is to represent all of the ways that computing devices might connect to the Internet and other wide-area networks.

Internet-connected server 305 executing software 306 from an associated data repository 309 in an embodiment of the invention provides a first stage in a two (or more) stage search process in an embodiment of the invention. Internet-connected servers 307 executing software 308 from an associated data repository 310, and 311 executing software 312 from a data repository 313 represent commercially available, and publically available search services, such as Mozilla™, Google™ and Yahoo™. In various embodiments of the invention, persons operating devices 301, 314 or 315 connect to server 305, which provides a unique service in search, as is described in enabling detail below.

Figure 4:
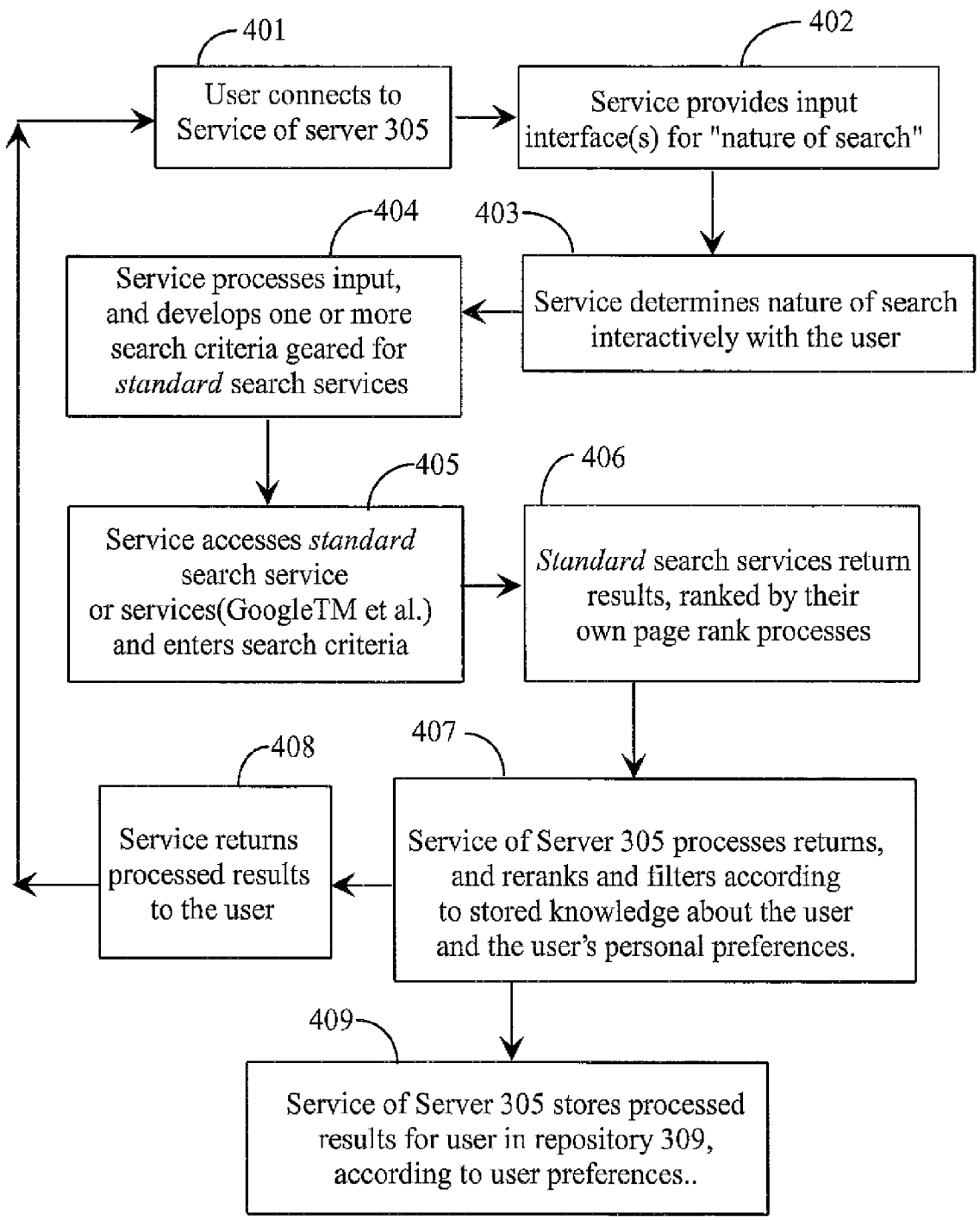
FIG. 4 is a process flow diagram depicting a process in an embodiment of the present invention.

FIG. 4 is a flow chart illustrating a search procedure for retrieving information from the Internet network, accomplished by a person operating one of devices 301, 314 or 315. At a first step 401 the user connects to a web page of the service of the invention provided by server 305 executing software 306. Typically the service will present a "welcome" page to the user, who, in a preferred embodiment, will be a client of the service. The service will thus have a profile for the client stored in data repository 309, and will recognize the client and address the client by name (or alias).

A purpose of the service is to provide a substantially richer and more detailed service for the client to address the many problems of the standard search services. One of the problems described above is the problem of the nature of search criteria, and the difficulty, for most people, of immediately coming up with useful words or phrases to enter as a search criteria in a standard search engine. Typically, in a standard search engine interactive page, there is a single entry window where a user may enter a word, a phrase, or a combination of words and phrases with logical operators.

In an embodiment of the present invention a user is directed to describe to the service the nature of the information desired, in more detail than in conventional search services, and in context, indicated as step 402 in FIG. 4. In one embodiment the user is prompted with specific questions to elicit and refine the user's intent. The interface will typically be a text entry window, but may be voice enabled in some embodiments, and there may be multiple choice questions to be answered. In this phase, the service determines the exact nature of the search to be conducted.

As an example of the process of the service in determining and refining the nature of the search the user may first enter a paragraph (step 403), perhaps as follows: "I want information about Abraham Lincoln, and particularly details of the assassination of Lincoln, and what became of the assassins." Such an entry would never suit a standard search engine for criteria. After the user's entry, the service will analyze, standardize and summarize the input, and in some instances provide a feedback to the user in one or more steps. The service might post to the user: "We determine the main focus is Abraham Lincoln" Yes/No. "A secondary focus is his assassination" Yes/No. "You want to know who were the assassins" Yes/No. The Yes/No combinations are interactive, and the user is prompted to select for each level. In this case the user would select Yes, Yes, No. The service then makes a more determined effort for the last portion, and returns "You want to know the further history of the assassins" Yes/No. The user may be satisfied with this, and indicate yes.

Now the service, at step 404, using the determined nature of the search, together with knowledge of standard search services and how they work, and together also with other knowledge about the user, develops specific search criteria to be entered to one or more standard search services. The service may, for example, determine that the search is a simple matter, and will require only a simple search on Google™, and will postulate search criteria for Google™. It may be that only one standard search engine may be used, but it will generally be the case that more than one search will be made. The service may postulate, for example, three sets of search criteria.

At step 405 the service opens three Google™ searches, one for each of the criteria sets determined to be best for the nature of the search determined, causes the three searches to be initiated, resulting in three "page-ranked" sets of results being returned to the service at step 406. At step 407 the service processes the results. The processing may simply be a selection and re-ranking of pages returned to the service, which may be based on client transaction history and other criteria, such as keywords in titles of the pages returned, and in most cases the listing will be truncated to a manageable number of pages. In a more robust embodiment, content of pages will be selected and "lifted" by the service to become a part of a composite report to the client. In this embodiment the client may get, at step 408, both ranked or re-ranked page titles (of course interactive, as in a standard search engine), but may also get a composite report, prepared by context analysis and summarization techniques, which, hopefully, will go a long way to present exactly what the client asked for: The story of the assassination, and what happened afterward.

As a further service to the user/client the service may provide for each client a specific portion of data repository 309 where a history of the client's searches may be recorded, and may be searchable in future by the client. The service would provide periodically to the client a chronological outline, and also an interactive search interface where the client may search his/her own past searches, and may reorganize and present the data in and from different searches in different ways.

In some embodiments of the invention the service use several standard search engines, and may develop in an interactive process with the client a range of search criteria for each, and may narrow and refine searches interactively with the client until the client is satisfied. So the service in some embodiments is a service that acts between a client and standard search engines, aiding the client in doing the best possible and most thorough searches for what the client really wants to find out, and that also interacts with the client as the searches develop, so the client can further refine a guide the search. The service in some embodiments also analyzes, standardizes and summarizes information in returned pages, and prepares in many embodiments a comprehensive search report based on the nature of the original search. For example, the unique service of the invention may summarize all of the discovered information for the person who wants the information about Abraham Lincoln as described above, in a normalized and standardized report, rather than only returning web links for ranked pages, as in commercial, conventional search facilities. In one embodiment the unique service of the invention may also provide a mapping of where the information was found; that is, a summary as well as the pages from which the info for the summary was taken, and indication of where in the pages the info was found.

In the case of mobile appliances 301, another piece of information involved in the overall interactive search will be the location of the mobile appliance, determined in many instances by a global positioning system (GPS) integrated into the mobile appliance. This information may be valuable in the step of determining the nature of the search, and also in what material might be returned and stored for the client.

It will be apparent to the skilled artisan that the embodiments and examples described above are not the only embodiments of the invention, and that many alterations and amendments may be made without departing from the spirit and scope of the invention. The invention is therefore limited only by the claims that follow.

We claim:

1. A system, comprising:
a network-connected server; and
software configured to execute on the network-connected server;
wherein the network-connected server, through execution of the software, is configured to provide an interactive interface to a computing device connected to a network, to determine a purpose for a search through iterative interaction that receives an initial search query, and presents at least one first clarifying question about the initial search query and receives at least one first answer to the at least one first clarifying question, after receiving the first answer, presents at least one second clarifying question, receives at least one second answer to the at least one second clarifying question to develop search criteria for the search based on the iterative interaction, to enter the search criteria to one or more search engines accessible through the network, and to collect search results of the search.

2. The system of claim 1, wherein the network-connected server is further configured to process the search results to generate processed results, and to send the processed results to the interactive interface.

3. The system of claim 1, wherein the network-connected server is configured to develop plural criteria relative to the purpose for the search, to enter the plural criteria in different entries to the one or more search engines to perform plural searches, and to aggregate plural search results from the plural searches.

4. The system of claim 1, wherein the network-connected server is further configured to process the search results by selecting a subset of pages returned by the one or more search engines.

5. The system of claim 1, wherein the network-connected server is further configured to process the search results by re-ranking pages returned ranked by the one or more search engines.

6. The system of claim 5, wherein the network-connected server is configured to re-rank the search results at least in part using one or more of a search history or information in a profile.

7. The system of claim 1, wherein the network-connected server is further configured to process the search results by selecting portions of content from one or more pages returned, and preparing a report to send to the interactive interface comprising the selected portions.

8. The system of claim 1, further comprising:
a data repository coupled to the network-connected server; and
wherein the network-connected server is configured to store the search results in the data repository, identified as to the computing device employed for conducting the search.

9. The system of claim 8, wherein the network-connected server is configured to provide interactive access to the search results by allowing the computing device to search and retrieve the search results.

10. A method, comprising:
interfacing via an interactive interface to a computing device connected to a network by executing software on a network-connected server;
determining a purpose for a search request received from the computing device through iterative interaction, including receiving at least one query term, and including causing the interactive interface to present at least one first refining question about the at least one query term, and including receiving, via the interactive interface, a first answer to the at least one first refining question, after receiving the first answer, causing the interactive interface to present a second refining question, and including receiving, via the interactive interface, a second answer to the second refining question;
developing search criteria based upon the purpose of the search;
submitting a search, including the search criteria, to one or more search engines connected to the network; and
collecting search results returned by the one or more search engines.

11. The method of claim 10, further comprising:
processing the search results returned by the one or more search engines to form processed results; and
causing the interactive interface to present the processed results.

12. The method of claim 11, wherein the processing includes selecting a subset of the search results returned by the one or more search engines.

13. The method of claim 11, wherein the processing includes re-ranking the search results.

14. The method of claim 13, wherein the re-ranking is accomplished at least in part using one or more of a search history or information in a profile.

15. The method of claim 11, wherein the processing includes:
selecting portions of content from one or more of the search results; and
preparing a report comprising the portions.

16. The method of claim 10, further comprising:
developing plural criteria relative to the purpose for the search;
entering the plural criteria in different entries to the one or more search engines to perform plural searches;
receiving plural results of the plural searches from the one or more search engines; and
aggregating the plural results of the plural searches to form aggregated results.

17. The method of claim 16, wherein the entering the plural criteria into one or more search engines further comprises entering the plural criteria into two or more search engines, and wherein the receiving plural results of the plural searches further comprises receiving plural results of the plural searches from the two or more search engines.

18. The method of claim 17, wherein the aggregating the plural results of the plural searches from the two or more search engines to form aggregated results includes re-ranking the aggregated results.

19. The method of claim 10, further comprising:
storing the search results in a data repository; and
identifying the search results in the data repository as being associated with the computing device.

20. The method of claim 19, further comprising providing interactive access to the search results by allowing the computing device to search and retrieve the search results.

21. The method of claim 10, wherein the interfacing includes interactively interfacing to the computing device connected to the network by executing the software retained in a data repository coupled to the network-connected server.

22. The method of claim 10, wherein the interfacing via the interactive interface comprises interfacing via an audio interface.

23. The method of claim 22, wherein the determining the purpose for the search request includes receiving audio input, and recognizing, using speech recognition, at least one of: the at least one query term, the first answer, or the second answer.

24. The method of claim 23, wherein the interacting via an interactive interface with a computing device comprises interacting with a mobile computing device.

25. The method of claim 24, further comprising:
automatically determining a location of the mobile computing device; and
wherein the step of determining the purpose for the search request includes using the location of the mobile device.

26. A method, comprising:
connecting to a server via a network;
displaying an interactive interface provided by the server;
obtaining, through iterative interaction, input that describes a nature of a search, wherein the obtaining includes:
obtaining at least one search term related to the nature of the search;

presenting at least one first clarifying question about the at least one search term;

receiving at least one first clarifying answer in response to the at least one first clarifying question about the at least one search term;

presenting, in response to receiving the at least one first clarifying answer about the at least one search term, at least one second clarifying question about the at least one search term;

receiving at least one second clarifying answer in response to the at least one second clarifying question about the at least one search term;

sending the input to the server for determining a purpose of the search; and receiving the search results from the server.

27. The method of claim 26, further comprising searching previously returned search results stored in a data repository.

28. A system, comprising:

a network interface configured to connect to a network-coupled server that provides a search service; and display hardware configured to present an interactive interface that is supplied by the search service, wherein the interactive interface is configured to iteratively collect input including at least one term related to a description of a search to refine a purpose for the search, and further configured to request and receive at least one first clarification related to the at least one term, and to send the at least one first clarification to the search service, and further configured to, in response to receiving the first clarification, request and receive at least one second clarification related to the at least one term, and to send the second clarification to the search service.

29. The system of claim 28, wherein the display hardware is coupled to one of a mobile appliance, a laptop computer, or a desktop computer.

30. The system of claim 28, wherein the display hardware is configured to present a past search interface provided by the search service, wherein the past search interface is further configured to interactively access search results for past searches from a data repository connected to the network-coupled server.

31. A system, comprising:

means for determining a purpose of a search initiated by a network-connected client device, the means for determining comprising: means for receiving at least one query term about the search from the network-connected client, means for requesting, from the network-connected client, at least one first item of refining information about the search, and means for receiving, from the network-connected client, the at least one first item of refining information and means for requesting, from the network-connected client, at least one second item of refining information about the search, and means for receiving, from the network-connected client, the at least one second item of refining information;

means for obtaining search results from at least one search engine based upon the purpose of the search; and means for processing the search results prior to returning the search results to the network-connected client device.

* * * * *